United States Patent [19]

Okada

[11] Patent Number: 4,809,266
[45] Date of Patent: Feb. 28, 1989

[54] TIME-DIVISION MULTIPLEX TRANSMISSION NETWORK SYSTEM FOR AN AUTOMOBILE VEHICLE

[75] Inventor: Kazuyoshi Okada, Yokohama, Japan

[73] Assignee: Nissan Motor Company, Limited, Japan

[21] Appl. No.: 833,606

[22] Filed: Feb. 27, 1986

[30] Foreign Application Priority Data

Mar. 14, 1985 [JP] Japan ................. 60-50856

[51] Int. Cl.$^4$ ............................................. H04J 3/02
[52] U.S. Cl. ................................. 370/85; 340/825.5
[58] Field of Search .................. 370/85, 90, 96; 340/825.5

[56] References Cited

U.S. PATENT DOCUMENTS

| | | | |
|---|---|---|---|
| 4,227,178 | 10/1980 | Gergaud et al. | 370/96 |
| 4,380,065 | 4/1983 | Hirtle et al. | 370/96 |
| 4,484,190 | 11/1984 | Bedard | 340/825.57 |
| 4,606,022 | 8/1986 | Suzuki et al. | 370/85 |

FOREIGN PATENT DOCUMENTS

| | | |
|---|---|---|
| 51-14589 | 5/1976 | Japan. |
| 1287334 | 8/1972 | United Kingdom. |
| 1427133 | 3/1976 | United Kingdom. |
| 1462052 | 1/1977 | United Kingdom. |
| 1494240 | 12/1977 | United Kingdom. |
| 2041592 | 9/1980 | United Kingdom. |

OTHER PUBLICATIONS

Ein Byteserielles Bitparalleles Schnittstellensystem fur Programmierbare Mebgerate-DIN IEC 625 Teil 1 Mai 1981. Wie Funktioniert der IEC-Bus?-Elektronik 1975; KLaus, pp. 72-78.
Microprocessor Interfacing Techniques-Zaks et al.; Sydex, Inc.; 1979; pp. 93-109.

Primary Examiner—Douglas W. Olms
Assistant Examiner—Frank M. Scutch, III
Attorney, Agent, or Firm—Lowe, Price, Leblanc, Becker & Shur

[57] ABSTRACT

A time-division multiplex transmission network system applicable to an automotive vehicle in which each data transmission station constituting the whole network system together with data reception stations is activated to transmit a data only when an address (station identification information) allocated thereto coincides with one of the series of information on the specification of a pair of stations between which the data is communicated. Consequently, discharge of a battery whose electric power is distributed into all data transmission and reception stations can remarkably be reduced since other transmission and reception stations are deactivated during the time slot at which the address allocated to the pair of transmission and reception stations coincides with the one information for specifying the data communication stations.

9 Claims, 5 Drawing Sheets

TIME-DIVISION MULTIPLEX TRANSMISSION NETWORK SYSTEM FOR AN AUTOMOBILE VEHICLE

BACKGROUND OF THE INVENTION

The present invention relates to a time-division multiplex transmission network system applicable to an automotive vehicle. Such kinds of time-division multiplex transmission network systems are exemplified by a Japanese Patent Application Unexamined Open No. Sho. 51-14589.

The disclosed system in the above-identified document will be described with reference to FIG. 1. A power supply line 10 is connected to a DC power generator 12 and to a vehicle battery 14. The power supply line 10 is also connected to a plurality of transmission stations 16-1, 16-2, ... and a plurality of reception stations 18-1, 18-2, .... Each transmission station 16-1, 16-2, ..., is furthermore connected to switches 20-1, 20-2, ..., such as switches for a wiper, headlights, and so on. In addition, each reception station 18-1, 18-2 is furthermore connected to actuators as loads 22-1, 22-2, ... which actuate in response to switching actions of the corresponding switches.

A data on switching information from the transmission stations 16-1, 16-2, ... to the reception stations 18-1, 18-2, ... is transmitted via a common data transmission line 24 in a time-division multiplex transmission mode. The above-described time-division multiplex transmission of data is carried out in accordance with a series of clock pulses generated by means of an address clock generator 26. The series of clock pulses is sequentially sent to the stations, i.e., transmission stations 16-1, 16-2, ... and reception stations 18-1, 18-2, ..., respectively. Consequently, the data is transmitted from one of the transmission stations 16-1, 16-2, ... and one or plural numbers of the reception stations 18-1, 18-2, ... which are specified by means of the series of clock pulses for each allocated time slot defined by each period of the clock pulses so that the actuators 22-1, 22-2 are automatically operated according to an on-and-off state of the corresponding switches 20-1, 20-2.

In the above-described construction of the time-division multiplex transmission system applied to the vehicle disclosed in the above-identified Japanese document, each period of the series of clock pulses generated by the address clock generator 26 is extended by using a switch 30 such as an ignition switch which is usually turned off when the vehicle is parked, since an electric power of the battery 14 is still consumed with the generation of electric power by means of the generator 12 stopped.

This causes the electric power consumption of the battery 14 to be suppressed so that an excessive discharge of the battery 14 can be prevented.

However, although the power consumption of the battery 14 can be reduced by the extension of the period of the series of clock pulses, it is difficult to further reduce the power consumption of the battery 14.

In addition, in a case when the data having plurality of bits is transmitted between a pair of the transmission and reception stations, within one time slot, each transmission station 16 (or each reception station 18) requires an independent clock generator which generates a clock pulse train signal in synchronization with which the data having the plurality of bits is transmitted (or received), as exemplified by a U.S. patent application Ser. No. 592,547 filed on Mar. 23, 1984, now pending (which corresponds to a Japanese patent Application Serial No. Sho. 58-105541 filed on June 13, 1983). In this case, since a ratio of the power consumption by these clock generators installed in the individual transmission stations (reception stations) to the whole power consumption of the battery is increased, the whole power consumption of the battery cannot remarkably be reduced.

SUMMARY OF THE INVENTION

With the above-described problem in mind, it is an object of the present invention to provide a time-division multiplex transmission network system applicable to an automotive vehicle which can sufficiently reduce a power consumption.

This can be achieved by providing the network system for the vehicle in which each data transmission station constituting the whole network system together with data reception stations is activated to transmit data only when an address (station identification information) allocated thereto coincides with one of the series of information on the specification of stations between which the data is communicated.

According to one aspect of the present invention, the network system comprises: (a) a plurality of data transmission and reception stations each interconnected via a data transmission line, and (b) first means for generating and outputting a series of information on a pair of stations between which a data is communicated in a time-division multiplex transmission mode to each of the data transmission and reception stations, each of the data transmission station including: (c) second means for determining whether an information for identifying the data transmission station itself coincides with the information outputted from the first means, (d) third means for generating and outputting an activation command when the second means determines that the data transmission station identifying information accords with the information outputted from the first means, and (e) fourth means responsive to the activation command of the third means for starting the transmission of the data on the common data transmission line.

BRIEF DESCRIPTION OF THE DRAWINGS

A more complete understanding of the present invention may be obtained from the following detailed description taken in conjunction with the attached drawings in which like reference numerals designate corresponding elements and in which.

DETAILED DESCRIPTION OF THE PREFERRED EMBODIMENT

Reference will hereinafter be made to the drawings in order to facilitate understanding of the present invention.

Figure 2:
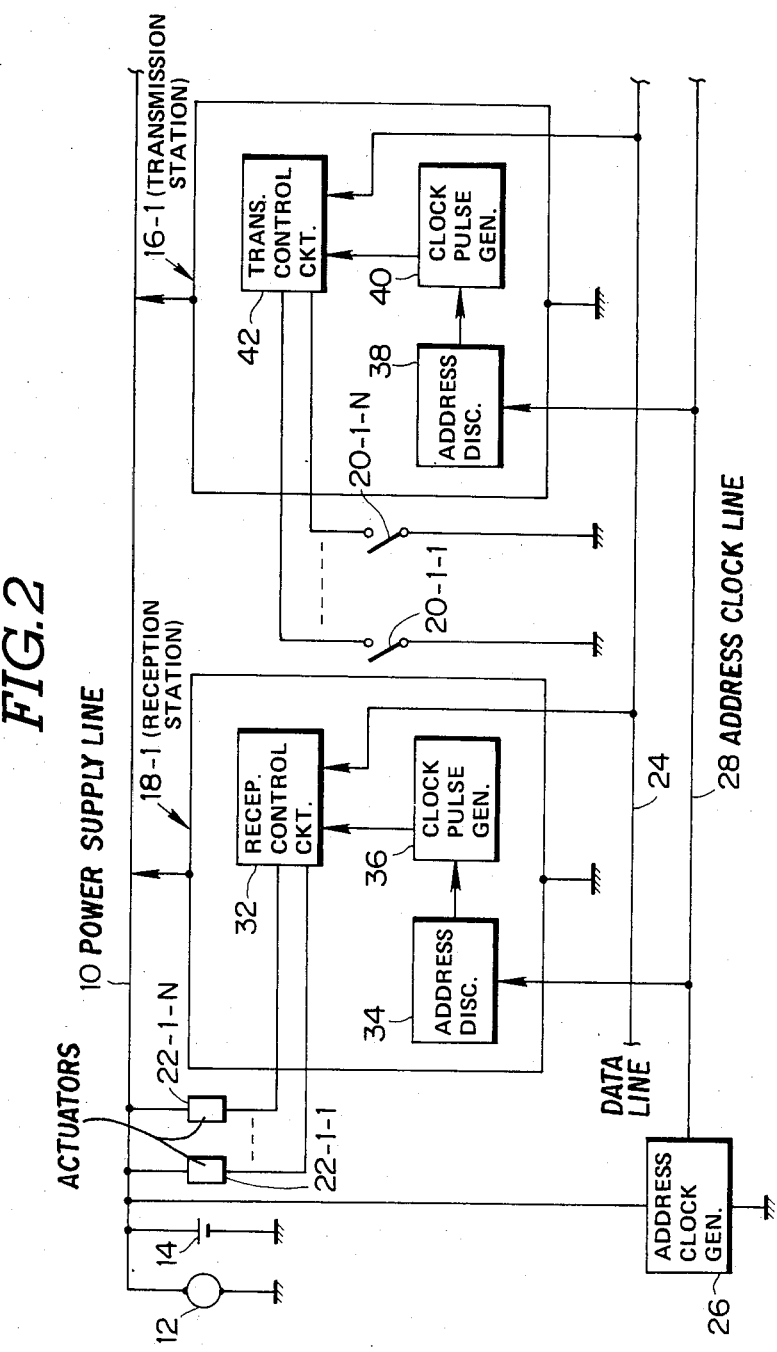
FIG. 2 is a circuit block diagram of the time-division multiplex transmission network system for the vehicle in a preferred embodiment according to the present invention.

FIG. 2 shows a preferred embodiment of a time-division multiplex transmission network system applicable to an automotive vehicle according to the present invention.

Any one of transmission stations from which data is transmitted and any one of reception stations by which the data is received are specified by means of a pulse train signal from an address clock generator 26. The pair of these transmission and reception stations 16-1, 18-1 are connected to a common data transmission line 24 and to an address clock line 28 on which the pulse train signal from the address clock generator 26 is sent. The other transmission stations and reception stations having the same construction as those shown in FIG. 2 are also connected to the data transmission line 24 and address clock line 28 (although not shown in FIG. 2).

The circuit construction and function of the address clock generator 26 are exemplified by a U.S. patent application Ser. No. 758,796 (now pending) filed on July 25, 1985, the disclosure of which is hereby incorporated by reference.

A reception control circuit 32 is installed on the reception station 18-1 for receiving the data on the data transmission line 24 and each actuator of an actuator group 22-1-1, 22-1-2, . . . 22-1-N connected between the power supply line 10 and reception control circuit 32 is operated in accordance with a transmitted information included in the data.

On the other hand, an address discriminator 34 is installed in the reception station 18-1 to receive the address clock pulse train signal from the address clock generator 26 via the address clock line 28. The address discriminator 34 discriminates a predetermined address information allocated to the reception station 18-1 from the address clock pulse train signal including information on the specification of the transmission station and reception station to be transmitted and received during each time slot defined by each period of the clock pulse of the address clock pulse train. When the address discriminator 34 identifies the predetermined address from the clock pulse signal derived from the address clock signal generator 26 via the address clock line 28, the discriminator 34 outputs a coincidence signal to a clock pulse generator 36 so that the clock pulse generator 36 is activated in response to the coincidence signal.

The clock pulse generated by means of the clock pulse generator 36 is sent to the reception control circuit 32 to activate the reception control circuit 32, wherein the received data via the data transmission line 24 is fetched in synchronization with the clock pulse generated by the clock pulse generator 36.

On the other hand, the transmission station 16-1 comprises the address discriminator 38 and clock pulse generator 40 in the same way as the reception station 18-1. The clock pulse generated by the clock pulse generator 40 is sent to a transmission control circuit 42. The clock pulse of the clock pulse generator 40 is used to send an input signal (on or off information) of each switch of a switch group 20-1-1, 20-1-2, . . . 20-1-N to the data transmission line 24 from the transmission control circuit 42.

Figure 3:
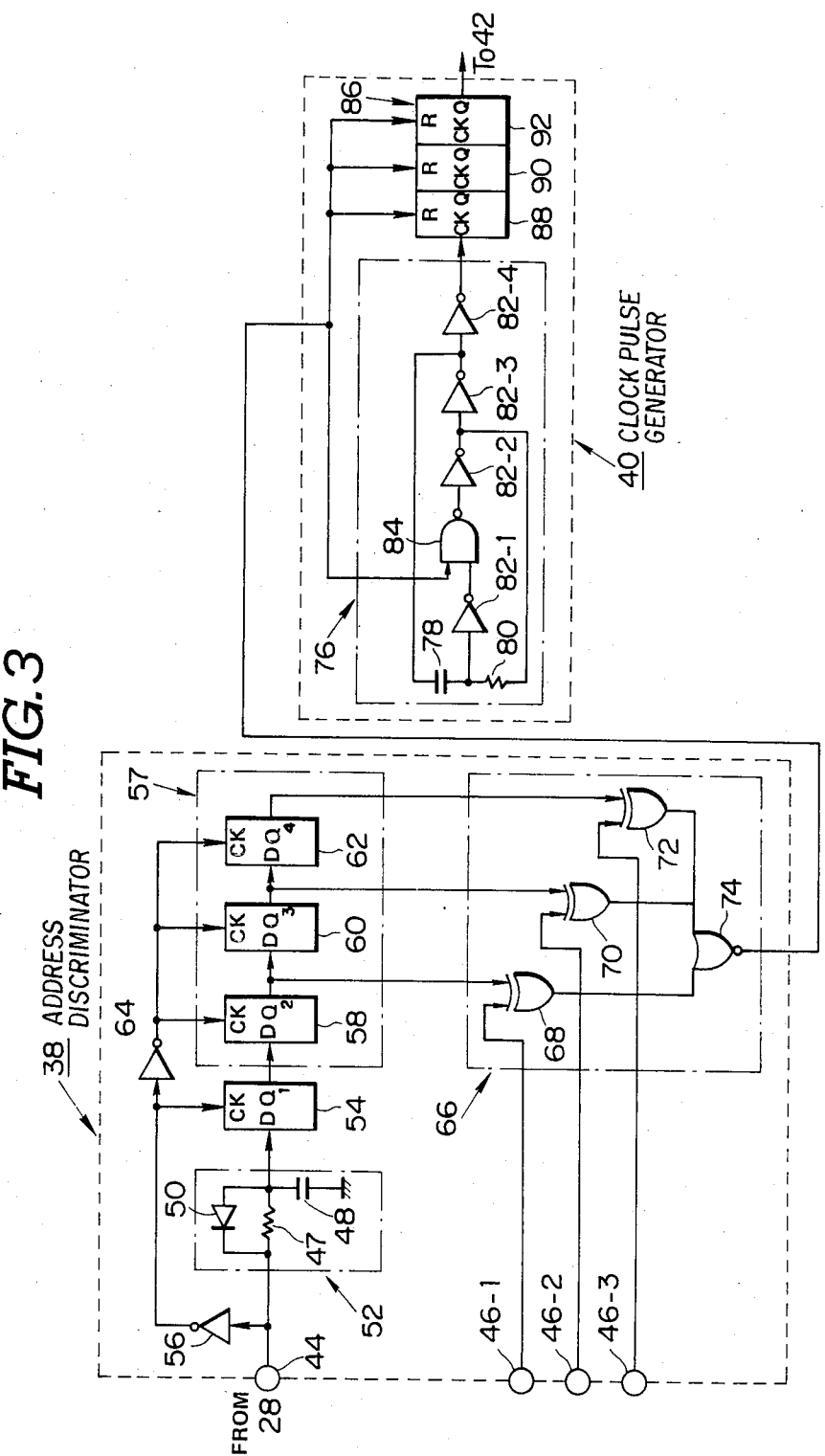
FIG. 3 is a detailed circuit block diagram of an address discrimination circuit 38 and clock pulse generator 40 shown in FIG. 2.

FIG. 3 shows internal constructions of the address discriminator 38 and clock pulse generator 40 installed in each of the transmission and reception stations.

The address clock derived from the address clock generator 26 shown in FIG. 2 is sent to a clock input terminal 44 of the address discriminator 38.

In addition, each address setting terminal 46-1, 46-2, 46-3 receives the station identification information, e.g., "0", "1", "0" in a bit parallel form.

Figure 4:
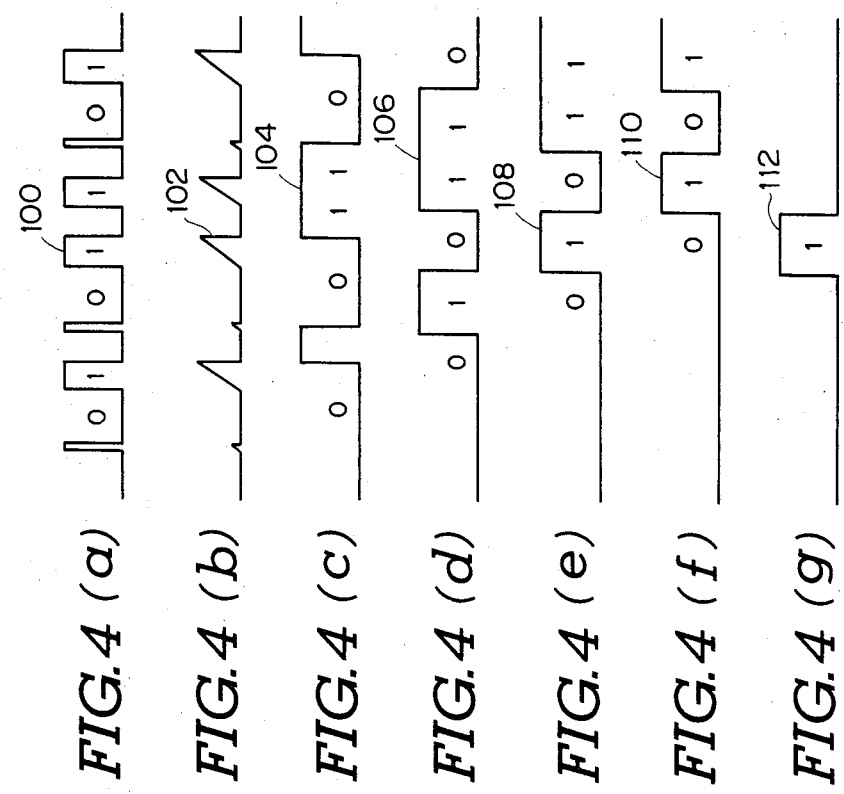
FIGS. 4(a) through 4(g) are timing charts of respective output signals of circuits shown in FIG. 3.

The clock pulse train sent to the clock input terminal 44 is a pulse-width modulated pulse (PWM) signal 100 shown in FIG. 4(a) generated by the address clock generator 26 and is further sent to a charge-and-discharge circuit 52. The charge-and-discharge circuit 52 includes a resistor 47, capacitor 48, and diode 50, as shown in FIG. 3. The output signal 102 of the charge-and-discharge circuit 52 is shown in FIG. 4(b) and is sent to a data input terminal D of a D-type flip-flop circuit 54.

A clock input terminal of the D-type flip-flop circuit 54 receives an inverted clock pulse from an inverter 56. The inverter 56 is connected to the clock input terminal 44. The D-type flip-flop circuit 54 fetches the data from the charge-and-discharge circuit 52 on a falling edge of the address clock signal. Hence, the Q output of the flip-flop circuit 54 is changed as shown in FIG. 4(c).

Hence, D-type flip-flop circuits 58, 60, and 62 fetch data in synchronization with each rising edge of the address clock pulse received via an inverter 64. Therefore, each Q output signal 106, 108, and 110 of the D-type flip-flop circuits 58, 60, 62 is changed as shown in FIGS. 4(d), (e) and (f). These three Q output signals 106, 108, 110 are inputted to respective first input terminals of Exclusive-OR gate circuits 68, 70, 72 constituting a logic comparison circuit 66. It should be noted that the respective other input terminals of the Exclusive-OR gate circuits 68, 70, 72 receive the above-described station identification information constituted by the parallel bits "0", "1", and "0". Output signals of these three Exclusive-OR gate circuits 68, 70, and 72 are sent to a three-input NOR gate 74. Consequently, when the Q output signals of the D-type flip-flop circuits 58, 60, 62 coincide with the station specification information, the output signal of the NOR gate 74 indicates "1" as shown in FIG. 4(g).

The output signal of the NOR gate 74 is sent to an oscillator 76 of the clock pulse generator 40.

The oscillator 76 includes a capacitor 78, a resistor 80, an inverter 82-1, a NAND gate 84, and inverters 82-2, 82-3, 82-4. One input terminal of the NAND gate 84 receives the output signal of the NOR gate 74 of the logic comparison circuit 66. Hence, an oscilation of the oscillator 76 is halted when the output signal of the NOR gate 74 indicates "0" and is initiated when the output signal thereof is turned from "0" level to "1" level.

On the other hand, the output signal of the oscillator 76 is sent to a divider 86 comprising three R/S flip-flop circuits 88, 90, 92.

Figure 5:
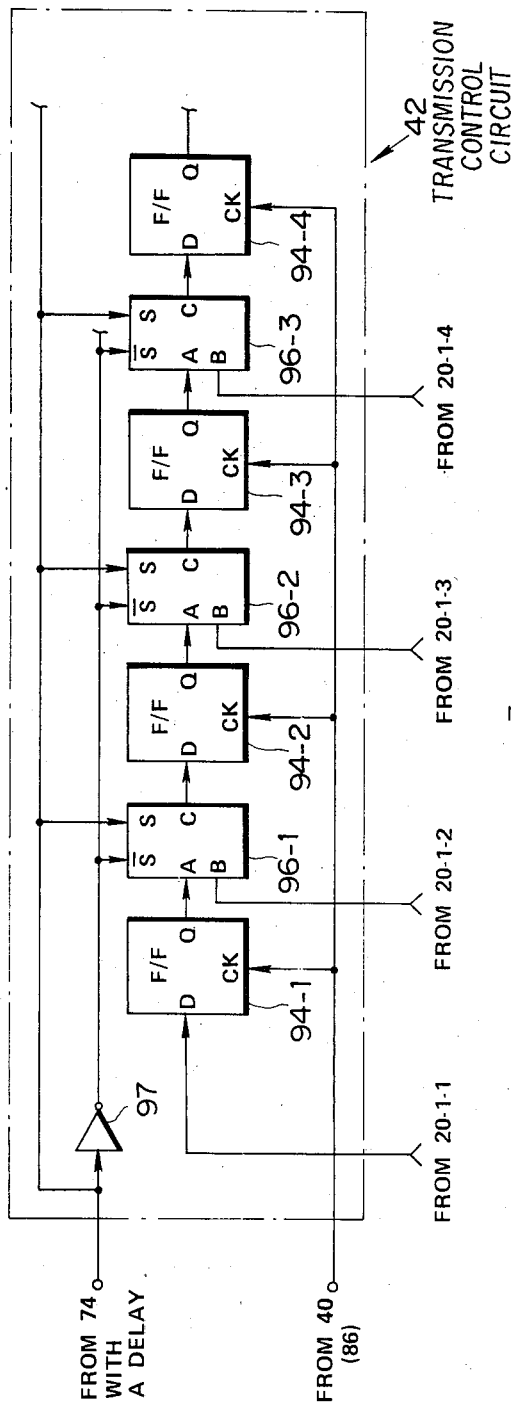
FIG. 5 is a detailed circuit block diagram of a transmission control circuit 42 shown in FIG. 2.

The divider 86 is installed only when the oscillation frequency of the oscillator 76 needs to be lowered and the frequency-divided signal of the divider 86 is sent to the transmission control circuit 42 shown in FIG. 5.

The transmission control circuit 42 is provided with a plurality of D-type flip-flop circuits 94-1, 94-2, 94-3, 94-4, . . . , clock input terminals of these flip-flop circuits 94-1, 94-2, 94-3, 94-4 receiving the clock pulse from the frequency divider 86.

B inputs of the switches 96-1, 96-2, 96-3 inserted between each of the D-type flip-flop circuits 94-1, 94-2, 94-3, and 94-4 and data input terminal of the first D-type flip-flop circuit 94-1 receive switching signals on the switches 20-1-1, 20-1-2, 20-1-3, 20-1-4, ..., respectively.

Furthermore, the Q output signal of the D-type flip-flop circuit 94-1 is sent to an A input of the switch 96-1, the C output signal of the switch 96-1 is sent to the data input of the D-type flip-flop circuit 94-2, the Q output signal of the D-type flip-flop circuit 94-2 is sent to the A input of the switch 96-2, the C output signal of the switch 96-2 is sent to the data input terminal of the D-type flip-flop circuit 94-3, the Q output signal of the D-type flip-flop circuit 94-3 is sent to the A input of the switch 96-3, and the C output signal of the switch 96-3 is sent to the data input of the D-type flip-flop circuit 94-4, respectively. The S inputs of the switches 96-1, 96-2, 96-3 ... receive the output signal of the NOR gate 74 shown in FIG. 3 after a predetermined delay for the output signal of the NOR gate 74 and $\bar{S}$ inputs of the switches 96-1, 96-2, 96-3, ... receive the inverted output signal of the NOR gate 74 via an inverter 97.

Figure 6:
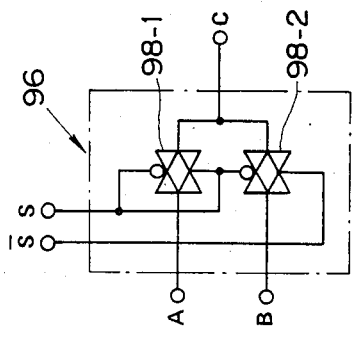
FIG. 6 is a detailed circuit block diagram of each D-type flip-flop circuit 94 shown in FIG. 5.

Each switch of the switch group 96 comprises, as shown in FIG. 6, a transmission gate 98-1 and transmission gate 98-2. When the S input indicates "1" and $\bar{S}$ input indicates "0", the A input signal is produced as the C output signal. When the S input indicates "0" and $\bar{S}$ input indicates "1", the B input signal is produced as the C output signal.

When the clock pulse generator 40 is activated in response to the output signal indicating "1" of the NOR gate 74, the transmission control circuit 42 is also activated so that the D-type flip-flop circuits 94-1, 94-2, 94-3, 94-4, ... read the respective switching signals of the switches 20-1-1, 20-1-2, 20-1-3, 20-1-4, .... It should be noted that since the output signal received by the transmission control circuit 42 from the NOR gate circuit 74 is delayed, the output signal state at this time remains at a "0" level.

Thereafter, when the delayed output signal of the NOR gate 74 indicates "1", the Q output signal of each D-type flip-flop circuit 94 is sent to the subsequent stage thereof so that the Q output signal of each D-type flip-flop circuit 94 is transferred toward the right-hand direction for each clock pulse.

In this way, when the input signal is converted into a serial signal by means of the D-type flip-flop circuits 94-1, 94-2, 94-3, 94-4, ..., the serially converted signal is sent to the data transmission line 24 as the transmission information.

On the other hand, the address discriminator 34 and clock pulse generator 36 of the reception station 18-1 to be a partner of the transmission station 16-1 includes the address discriminator 34 and clock pulse generator 36 having the same constructions as those in the transmission station and, therefore, the reception station 18-1 is also activated at that time.

The reception control circuit 32 takes a synchronization with the clock pulse of the clock pulse generator 36 to parallelize the transmitted information, the respective actuators 22-1-1, 22-1-2, ..., 22-1-N being actuated on the basis of the respective parallelized signals.

If the address clock generated by the address clock generator 26 which does not currently correspond to the address setting information, i.e., "0", "1", and "0" described above within another time interval (time slot), the NOR gate 74 outputs the signal indicating "0" so that the gate of NAND gate 84 is closed. Consequently, the operations of the reception control circuit 32, clock pulse generator 36, clock pulse generator 40, transmission control circuit 42 are halted and no power consumption of the battery 14 results.

If the address clock generated by the address clock generator 26 which corresponds to the address setting information, i.e., "0", "1", and "0" is generated, the output signal of the NOR gate 74 in FIG. 3 indicates "1". Therefore, the gate of the NAND gate 84 is opened so that all circuits of the reception control circuit 32, clock pulse generator 36, clock pulse generator 40, and transmission control circuit 42 are activated.

When the clock pulse generator 40 and transmission control circuit 42 of the transmission station 42 are activated, the input signals derived from the switches 20-1-1, 20-1-2, ..., 20-1-N are converted into the serial string signal in synchronization with the clock pulse signal of the clock pulse generator 40 and sent to the data transmission line 24.

At this time, the reception station 18-1 is activated and the reception control circuit 32 converts the above-described serial string signal sent from the data transmission line 24 and the operations of the actuators 22-1-1, 22-1-2, ..., 22-1-N are carried out in synchronization with the clock pulse of the clock pulse generator 36.

In this way, only the transmission and reception stations 16, 18 specified as the pair of transmission and reception stations between which the data is transferred by the specification of the address clock pulse train signal are activated so that the data is transmitted via the data transmission line 24 from the specified transmission station to the specified reception station.

Figure 1:
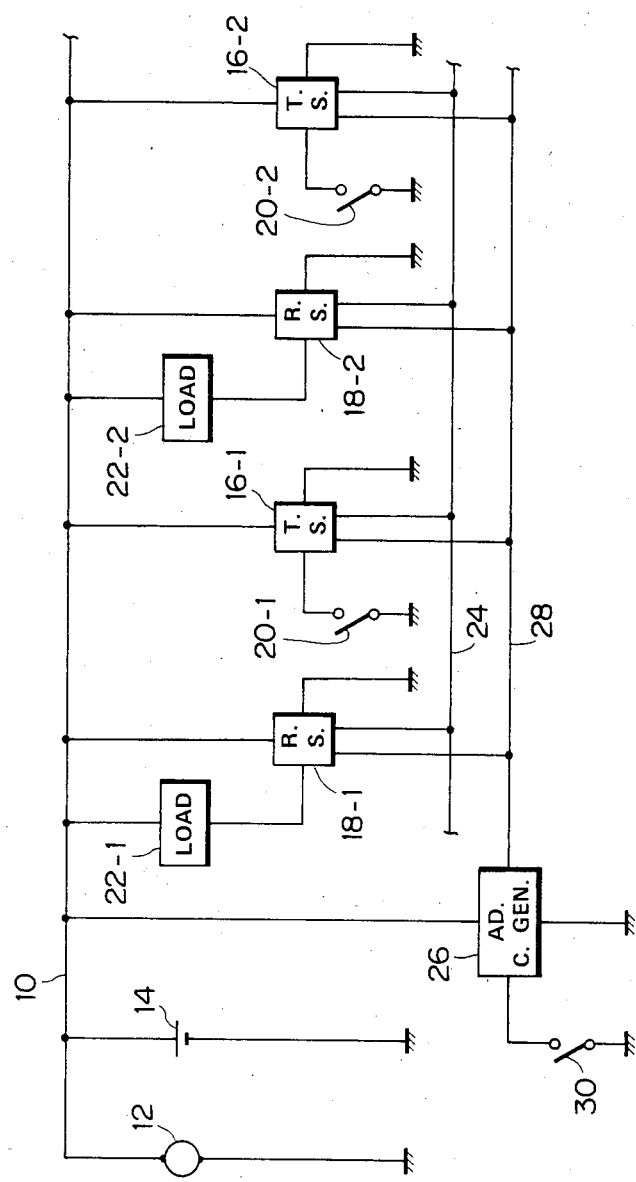
FIG. 1 is a circuit block diagram of a time-division multiplex transmission network system applied to an automotive vehicle exemplified by Japanese Patent Application Unexamined Open No. Sho. 51-14589.

As described above, since only the transmission and reception stations 16, 18 are activated by the specification of the address clock pulse derived from the address clock generator 26, the electric power of the battery 14 consumed at each of the transmission and reception stations can remarkably be reduced. Consequently, the excessive discharge of the battery 14 can effectively be prevented. This can apply equally well to a case when the vehicle runs. Since the switch 30 of FIG. 1 can be omitted, the cost reduction of the whole system can be achieved during a mass-production.

In this way, the time-division multiplex transmission network system for the vehicle according to the present invention, the power consumption can remarkably be reduced since each transmission station is activated only when the station is specified as a partner of the data transmission.

It will clearly be understood by those skilled in the art that the foregoing description may be made in terms of the preferred embodiment and various changes and modifications may be made without departing from the scope of the present invention which is to be defined by the appended claims.

What is claimed is:

1. A network system, comprising:
   (a) a plurality of data transmission and reception stations each interconnected via a common data transmission line and via an address clock line; and
   (b) first means for generating and outputting via the address clock line to each of said data transmission and reception stations a series of information identifying a pair of data stations between which data is communicated in a time-division multiplex transmission mode;

each of said data transmission stations including; (c) second means, responsive to the information from said first means, for determining whether a stored information identifying the data transmission station itself coincides with the information outputted from said first means via the address clock line; (d) third means for generating and outputting an activation command responsive to a determination by said second means that the data transmission station identifying information accords with the information outputted from said first means; and (e) fourth means responsive to the activation command of said third means for starting the transmission of the data on the common data transmission line, thereby enabling transmission of said data on the data transmission line in response to said second means.

2. The network system according to claim 1, wherein each of said data reception stations includes;
   (a) fifth means for determining whether the information for identifying the data reception station itself accords with the information outputted from said first means; and
   (b) sixth means for receiving the data from the data transmission line responsive to determination by said fifth means that the data reception station identifying information accords with the information outputted from said first means, thereby enabling reception of said data from the data transmission line in response to said fifth means.

3. The network system according to claim 1, wherein said fourth means comprises a clock pulse generator for generating and outputting a clock pulse train signal in response to the activation command from said third means so that the data is transmitted on the common data transmission line in synchronization with the clock pulse train signal outputted by said clock pulse generator.

4. The network system according to claim 2, wherein said sixth means comprises a clock pulse generator for generating and outputting a clock pulse train signal when said fifth means determines that the data reception station identifying information accords with the information outputted from said first means.

5. The network system according to claim 3, wherein said fourth means further comprises further means for transmitting a plurality of parallel switching information on switches connected in parallel therewith on the common data transmission line in a serial form of bits as the data in synchronization with the clock pulse train signal generated and outputted by said clock pulse generator.

6. The network system according to claim 5, wherein said further means receives the activation command from said third means with a predetermined delay and comprises a plurality of D-type flip-flop circuits whose number corresponds to that of the switches, each of said flip-flop circuits including a clock input terminal receiving the clock pulse train signal and each flip-flop latching the switching information of the corresponding switch at a time before the predetermined delay.

7. The network system according to claim 6, wherein each of said data reception stations comprises receiving means for receiving the data from the common data transmission line, converting the data in the serial form of bits into a parallel form of bits in synchronization with a clock pulse train, each bit representing the switching information on the corresponding switch and being sent to a corresponding actuator which is actuated in accordance with the corresponding switching information.

8. The network system according to claim 7, wherein a frequency of the clock pulse train in synchronization with which the data in the serial form of bits is converted into the parallel form of bits by said receiving means substantially matches with that generated by said fourth means of the transmission station.

9. The network system according to claim 5, wherein said further means comprises a plurality of consecutive D-type flip-flop circuits whose number corresponds to that of the switches,
   each flip-flop circuit having a D input terminal thereof responsive to the switching information of the corresponding switch for latching the switching information of the corresponding switch at a time before the predetermined delay and a clock input terminal receiving the clock pulse train signal from the clock pulse generator, the switching information being formed in a bit serial data signal.

* * * * *